(12) United States Patent
Pinto Ribeiro

(10) Patent No.: US 8,893,564 B2
(45) Date of Patent: Nov. 25, 2014

(54) CUSHION MAT WITH PRESSURE SENSOR

(75) Inventor: Susana Carla Pinto Ribeiro, Vermoim (PT)

(73) Assignee: Fico Cables Lda, Vermoim-Maia (PT)

( * ) Notice: Subject to any disclaimer, the term of this patent is extended or adjusted under 35 U.S.C. 154(b) by 463 days.

(21) Appl. No.: 13/082,700

(22) Filed: Apr. 8, 2011

(65) Prior Publication Data
US 2011/0248534 A1 Oct. 13, 2011

Related U.S. Application Data

(60) Provisional application No. 61/350,686, filed on Jun. 2, 2010.

(30) Foreign Application Priority Data

Apr. 9, 2010 (EP) .................................. 10159502

(51) Int. Cl.
G01L 1/26 (2006.01)
B60N 2/00 (2006.01)
B60N 2/70 (2006.01)

(52) U.S. Cl.
CPC ............. B60N 2/002 (2013.01); B60N 2/7094 (2013.01)
USPC ................................... 73/862.391

(58) Field of Classification Search
CPC .............................. B60N 2/002; B60N 2/7094
USPC ..................................... 73/866.391; 297/337
See application file for complete search history.

(56) References Cited

U.S. PATENT DOCUMENTS

| 6,360,618 | B2 | 3/2002 | Anahid et al. |
| 6,412,874 | B1 * | 7/2002 | Mayer ..................... 297/452.52 |
| 6,663,178 | B2 * | 12/2003 | Fourrey et al. ............. 297/284.3 |
| 7,775,603 | B2 * | 8/2010 | Mundell et al. .......... 297/452.52 |
| 2004/0159486 | A1 | 8/2004 | Mutou et al. |
| 2010/0133732 | A1 | 6/2010 | Yamaguchi et al. |

FOREIGN PATENT DOCUMENTS

| DE | 2230240 | 1/1974 |
| DE | 19943890 C1 | 2/2001 |
| EP | 1281942 A1 | 2/2003 |

(Continued)

OTHER PUBLICATIONS

English translation of FR 2,937,291.*

Primary Examiner — Lisa Caputo
Assistant Examiner — Brandi N Hopkins
(74) Attorney, Agent, or Firm — Raymond R. Ferrera; Adams and Reese LLP

(57) ABSTRACT

The present invention relates to a cushion mat 1 for integration into an automotive seat, comprising a set of metal wire springs 10, plastic connectors 20, connecting the wire springs 10 with each other to form a cushion mat 1, and at least one pressure sensor 30 directly connected to one of the plastic connectors 20 for providing a seat occupation signal. Further a method for the production of cushion mats 1 for integration into an automotive seat is disclosed, comprising the following steps (a) injection molding of plastic material around a set of metal wire springs 10 to form a cushion mat 1 with plastic connectors 20, wherein the plastic connectors 20 having at least one assembly area 24 for a pressure sensor 30, (b) arranging at least one pressure sensor 30 at the assembly area 24, and (c) connecting the pressure sensor 30 at the assembly area 24.

14 Claims, 2 Drawing Sheets

(56) References Cited

FOREIGN PATENT DOCUMENTS

Figure 1:
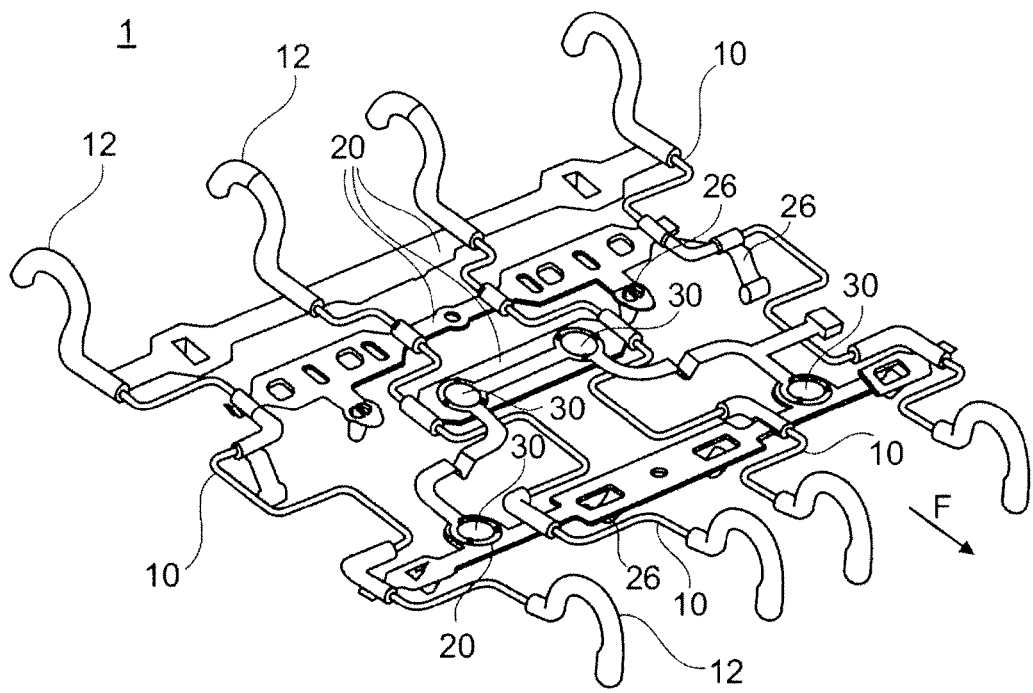

| EP | 1593547 B1 | 9/2009 |
|---|---|---|
| FR | 2870489 | 11/2005 |
| FR | 2937291 | 4/2010 |
| JP | 2001180353 A | 7/2001 |
| WO | 9835861 A1 | 8/1998 |
| WO | 2005012849 A1 | 2/2005 |

* cited by examiner

CUSHION MAT WITH PRESSURE SENSOR

STATEMENT OF RELATED CASES

Pursuant to 35 U.S.C. 119(a), the instant application claims priority to prior European application number 10 159 502.3, filed Apr. 9, 2010. This application also claims the benefit of U.S. Provisional Application No. 61/350,686, filed Jun. 2, 2010.

FIELD OF THE INVENTION

The present invention relates to a cushion mat for the integration into an automotive seat. Such cushion mats are generally known in the prior art and are used in the seat and the back rest of a motor vehicle seat and act for the suspension of the cushioning.

PRIOR ART

Cushioning mats made of metal wires are known in the prior art which carry the cushioning of a seat or of a back rest of a motor vehicle seat. Such cushioning mats are usually hinged into a metal seat frame of the motor vehicle seat. Usually, the cushioning mat consists of specially formed metal wires which are connected to each other by appropriate means to provide a suspension respectively a cushioning effect. The cushioning behavior of a motor vehicle seat is influenced by the suspension effect of the cushioning mat to a great extend. An example for a cushioning mat having formed metal wires that are connected to each other by plastic links is known from the EP 1 593 547 B1.

Further, occupation detection systems in motor vehicle seats are known. Such occupation detection systems are used for example for seat belt reminder systems and for deactivating the passenger airbags if seats are not occupied. Such occupation detection systems are arranged at different locations in the motor vehicle seat. Some of the occupant detection systems comprise pressure sensors that are arranged above the cushioning directly under a seat cover of the seat. Other systems are arranged below the cushioning at the so called "B-Plane" of the seat. Such systems are usually connected to the seat frame of the motor vehicle seat. Examples for occupation detection systems can be found in the WO 98/35861, WO 2005/012849, EP 1 281 942 A1, JP 2001/180353, U.S. Pat. No. 6,360,618 B2, and the US 2004/0159486 A1. Such occupant detection systems have the disadvantage that they require totally different seat constructions, complicated mechanical arrangements or require additional mounting steps for the force sensors at the seat frame.

It is, therefore, the problem of the present invention to provide an occupant detection system that is integrated into the motor vehicle seat and is easier to manufacture, easier in assembly, more cost efficient, and does not require modifications of the seat frame. Further, the occupant detection system should be unnoticeable for the passenger and should not have negative effects on the suspension behavior of the motor vehicle seat. Further, the occupant detection system must be very reliable, since security relevant functions depend on the sensing of the occupant detection system.

SUMMARY OF THE INVENTION

The above-mentioned problems of solved by a cushion mat according to the invention as defined in independent product claim 1 or independent method claim 14, respectively. Further features or method steps of the invention are disclosed in the dependent claims.

Particularly the above-mentioned problems are solved by a cushion mat for integration into an automotive seat, comprising a set of metal wire springs, plastic connectors, connecting the wire springs with each other to form a cushion mat, and at least one pressure sensor directly connected to one of the plastic connectors for providing a seat occupation signal.

Since the pressure sensor is directly connected to one of the plastic connectors of the cushion mat, the sensors are easy to assemble and can be arranged at any suitable position of the cushion mat. Further, since the pressure sensors are a part of the cushion mat, no additional mounting steps for any pressure sensors at the seat are needed. The pressure sensors are mounted at the seat by mounting the cushion mat at the seat.

Further, no adoption of the seat frame is necessary for the installation of a cushion mat with pressure sensors instead of a cushion mat without pressure sensors. Therefore, the occupant detection system can easily be integrated into existing motor vehicle seats. Since the pressure sensors are directly connected to one of the plastic connectors no additional assembly elements are used at the cushion mat for holding the pressure sensors. Additional, the cushion mat can be produced very cost efficient.

In a preferred embodiment the at least one pressure sensor is connected to the plastic connector by thermal deformation of parts of the plastic connector. Since the pressure sensor is directly connected to one of the plastic connectors by thermal deformation of parts of plastic connectors the assembly can be performed very easily, very cost efficiently and very reliable. Such a thermal deformation connection step can also easily be automated.

In a further preferred embodiment the at least one pressure sensor is connected to the plastic connector by over-molding of the plastic connector over a part of the pressure sensor. By overmolding of the plastic connector over at least a part of the pressure sensor, further assembly steps are avoided and a very reliable connection of the pressure sensor to the cushion mat is provided.

In a further preferred embodiment, the pressure sensor is mechanically connected, glued and/or welded to the plastic connector. Alternative assembly methods can also be used for connecting the pressure sensor to the plastic connectors.

Preferably at least one of the plastic connectors comprises an assembly area for the at least one pressure sensor. The plastic connectors can be provided with dedicated assembly areas, to which the pressure sensors are assembled.

Preferably the assembly area comprises plastic pins that cooperate with corresponding holes of the pressure sensor and wherein the pins are thermally deformed to fix the pressure sensor at the plastic connector. The plastic pins define the exact position of the pressure sensor at the corresponding plastic links and they can easily be thermally deformed for a very easy and very reliable connection of the pressure sensor or pressure sensors at the plastic links.

In a preferred embodiment the assembly area is arranged at an area of highest load of the cushion mat. By doing so, it is ensured, that the pressure sensor is reliably activated, when the seat is occupied.

On the other hand the pressure sensor can also be arranged at an assembly area that is arranged at an area of lowest load of the cushion mat. This ensures, that a seat occupation signal is also provided, if the passenger does not take the optimal position on the seat. In such a case, the pressure sensor signal is more reliable despite different passenger positions.

In a preferred embodiment the pressure sensor is a membrane switch that switches when the load applied to the membrane switch exceeds a predetermined value. Such membranes switches are very robust, very cost efficient, and in many cases even water resistant and, therefore, are particularly suitable for the use in an occupant detection system in a motor vehicle seat. Additionally, they are very thin and have no negative effects on the cushioning behavior of the cushion mat.

Preferably, the pressure sensor switches when a load of 16 kg is applied to the final seat. In this case, a reliable occupant detection signal is provided even if a child is sitting on the seat.

Preferably, the pressure sensor is electrically connected to flexible film wires. Flexible film wires can be arranged at the cushion mat without negatively affecting the suspension effect of the cushion mat. Further, they are very thin such that no modification of the mechanically required design of the cushion mat is needed. Preferably all pressure sensors of the cushion mat are connected by flexible film wires and form an integral part that is mounted at the plastic links of the cushion mat.

Preferably, at least one of the flexible film wires has an S-shape. By means of an S-shape of the flexible film wires they can yield out of the plane of the cushion mat.

Preferably, at least one of the film wires has a portion which is formed V-shaped. By means of the S-shape and a V-shaped portion it is further avoided, that during use a significant tension is subjected to the flexible film wires. This avoids, that the flexible film wires are torn and may break during use. This increases the reliability of the overall seat occupation system.

In a further preferred embodiment the cushion mat is designed to be arranged below a seat cushioning of an automotive seat in a B-plane, that means under the main cushioning foam of the seat.

Preferably the metal wire springs comprise attachment means for the assembly of the cushion mat into a seat frame of an automotive seat, wherein the attachment means are plastic-overmolded metal wire hooks.

The above mentioned problems are also solved by a method for the production of cushion mats for integration into an automotive seat, comprising the following steps:

a. injection molding of plastic material around a set of metal wire springs to form a cushion mat with plastic connectors, wherein the plastic connectors having at least one assembly area for a pressure sensor;

b. arranging at least one pressure sensor at the assembly area; and c. connecting the pressure sensor at the assembly area.

According to the invention the pressure sensors are connected at dedicated assembly areas that are part of injection over-molded plastic connectors. Therefore, the pressure sensors are an integral part of the cushion mat. A cushion mat with integrated pressure sensors is manufactured by this method and no further assembly steps for separate pressure sensors at the seat or seat frame are necessary.

Preferably, the step of connecting the pressure sensor at the assembly area further comprises the step of thermally deforming a part of the assembly area to fix the pressure senor.

SHORT DESCRIPTION OF THE DRAWING

Figure 2:
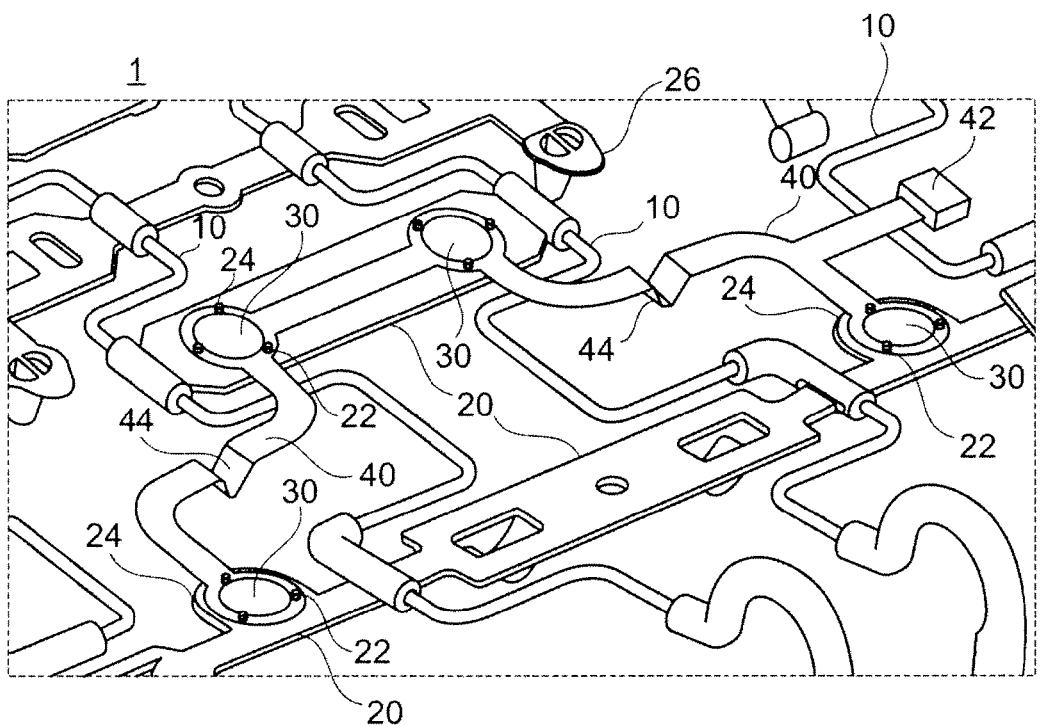
Figure 3:
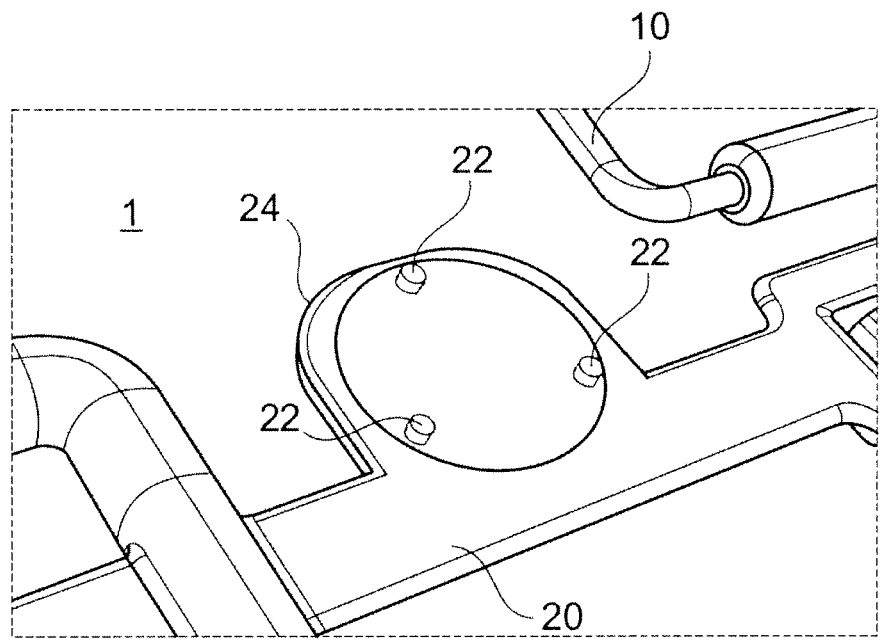
Figure 4:
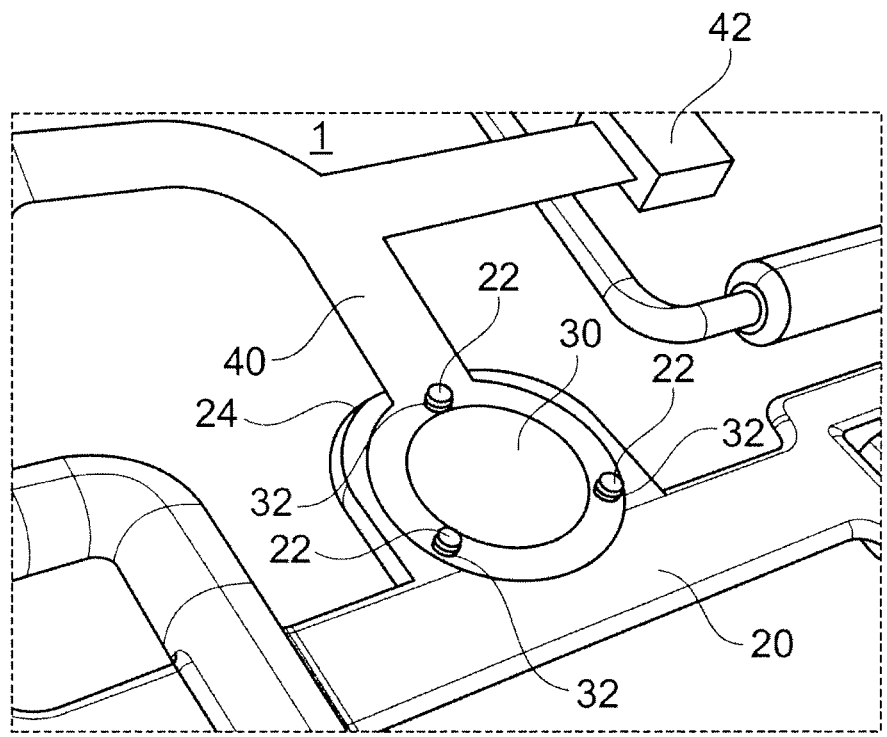

In the following preferred embodiments of the invention are shown by accompanying drawings. It shows:

FIG. 1 a three-dimensional view of a cushion mat according the invention;

FIG. 2 a three-dimensional detailed view of the cushion mat according FIG. 1 showing the integrated pressure sensors;

FIG. 3 a three-dimensional detailed view of the cushion mat according FIG. 1 showing an assembly area for a pressure sensor; and FIG. 4 the three-dimensional detailed view of FIG. 3 with mounted pressure sensor.

DETAILED DESCRIPTION OF THE PREFERRED EMBODIMENT

In the following preferred embodiments of the present invention are described in detail with respect to the drawings.

FIG. 1 shows a three-dimensional view of a cushion mat 1 according to the invention. The cushion mat 1 comprises four metal wire springs 10 which are bent in a staggered fashion to provide elasticity. Plastic connectors 20 which are injection overmolded over the set of metal wire springs 10 interconnect the wire springs 10 with each other to form the basic structure of the cushion mat 1. As illustrated in FIG. 1 the plastic connectors 20 may have almost any arbitrary shape and are generally designed as flat plastic bands in between the wire springs 10. The plastic connectors 20 surround the wire springs 10 by tube shaped portions.

The design and the position of the plastic connectors 20 together with the elasticity of the metal wire springs 10 define the support behavior of the cushion mat 1. Therefore, the cushion mats 1 my have different support behaviors at different locations of the cushion mat 1 to increase the sitting comfort.

Further, the plastic connectors 20 may comprise straps 26 or other connecting elements for connecting of wires, bowden cables, etc. which may be needed at the seat and which may be mounted to the cushion mat 1. The cushion mat 1 at both ends of each metal wire spring 10 comprises hooked shaped ends 12, which are also overmolded by a plastic material. By means of such overmolded end portions—for example the shown hooks 12—the cushion mat 1 is mounted in a surrounding metal seat frame (not shown) of a vehicle seat. The plastic overmold serves to avoid noise.

The cushion mat 1 is arranged in the so called "B-plane" of the seat, i.e. above the cushion mat 1 usually a foam cushioning is arranged that is covered by a cloth or leather cover.

According to the invention, the cushion mat 1 further comprises at least one pressure sensor 30, which is directly connected to one of the plastic connectors 20 for providing a signal for a seat occupation system. Such seat occupation systems are used to activate or deactivate passenger security systems like airbags, belt tighteners and are used for seat belt reminder systems. If a certain load—for example 16 kg—is applied to the seat, the pressure sensors detect that the seat is occupied and provide a signal for a seat belt reminder system that acoustically informs the passenger that the seat belt is not fastened, yet. Of course the cushion mat 1 with pressure sensor 30 can be used for other passenger detection systems as well.

FIG. 2 shows a detailed view of the cushion mat 1 according FIG. 1. Here, the area is shown, where the pressure sensors 30 are located at the plastic connectors 20. As it can be seen in FIGS. 1 and 2, preferably four pressure sensors 30 are used, which are arranged symmetrically (in driving direction F) on a cushion mat 1 for a seat cushion. Two of the pressures sensors 30 are arranged at a first row of plastic connectors 20. The orientation of the cushion mat 1 can be seen in FIG. 1 in respect to the driving direction F of the vehicle. Two other pressure sensors 30 are arranged in a second row left and right of the center of the cushion mat at a common plastic connector 20. By the provision of four pressure sensors 30 it is ensured that a seat occupation is reliably detected. Since the pressure sensors 30 are arranged at the cushion mat 1, i.e. at the so called "B-plane" of the seat—and not as in other solutions directly below the cover—the pressure sensors 30 are not noticeable by passengers. However, the position and arrangement of the pressure sensors 30 has to be chosen such that a reliable seat occupation signal is provided even if the passenger adopts a slightly different position on the seat.

In the shown arrangement the pressure sensors 30 are arranged at an area of the highest load of the cushion mat 1. However, they can also be arranged at an area of the lowest load of the cushion mat 1, depending on the desired sensing strategy.

The pressure sensors 30 are preferably formed as membrane switches that switch when the load applied to membrane exceeds a predetermined value. Such membrane switches are vary reliable, very cost efficient and very flat, such that they are favorable for the intended use at a cushion mat 1. Preferably the pressure sensor 30 switches when a load of 16 kg is applied to the final seat. Of course, the cushioning of the seat distributes the 16 kg load on the entire surface of the cushion mat 1 such that each pressure sensor switches already at a much lower load, for example at a load of 1-4 kg (10-40 N).

Other pressure sensors like conductive or inductive pressure sensors 30 may also be used at the cushion mat 1 instead of a membrane switch. Such pressure sensors 30 may measure the actual load applied to the seat in order to determine the weight of the passenger and to distinguish between children and adults.

As it can be seen in FIG. 1 and FIG. 2 the pressure sensors 30 are electrically connected to each other by flexible film wires 40 which can be manufactured together with a membrane switch as an integral part. For an electrical connection of the pressure sensors the flexible film wires 40 are connected to a plug connector 42 which connects the cushion mat with the board electronics of a motor vehicle. As seen in FIG. 2 the flexible film wires 40 have essentially an S-shape and are flat in the B-plane, such that a pressure onto the B-plane flexes the flexible film wires 40. In order to guarantee, that the flexible film wires 40 are not torn or may brake during use a V-shaped section 44 in the flexible film wires is provided that allows a length elongation of the flexible film wires 40.

In FIG. 3 and FIG. 4 the preferred mounting method of the pressure sensors 30 to the plastic connectors 20 is shown. FIG. 3 shows the assembly area 24 of a plastic connector 20. Each pressure sensor 30 is connected to a specific assembly area 24 of the plastic connector 20. The assembly area is provided with plastic pins 22 that are integrally injection molded together with the plastic connector 20. The pins 22 have a certain length that allows that the pressure sensor 30 which has corresponding holes 32 is held in place at the assembly area 24. For a secure connection of the pressure sensor 30 at the plastic connector 20 the pins 22 are then thermally deformed at their tip in order to form a thicker head. This connects the pressure sensor 30 very reliable at the corresponding assembly area 24. Such a thermal deformation of the pins 22 can easily be done manually or automatically by means of a hot tool that is pressed against the pins 22 or by a laser beam which melts the tip of the pin 22.

The person skilled in the art will recognize that parts of pressure sensors 30 can also be directly overmolded by the plastic connectors 20. This can favorably be done simultaneously to the injection molding of the plastic connector itself. In this way by only one injection over-molding step the final cushioning mat 1 is manufactured.

Alternatively, the pressure sensors 30 can be mechanically connected, glued and/or welded to the plastic connector 20. However, from a mechanical point of view and in view of a very easy assembly the connection by thermal deformation of the pins 22 is preferred.

LIST OF REFERENCE SIGNS 1 cushion mat
10 metal wire springs
12 hocks
20 plastic connectors
22 parts/pins
24 assembly area
26 connection elements
30 pressure sensors
32 mounting holes in pressure sensors
40 flexible film wires
42 electrical connector
44 V-shaped portion

The invention claimed is:

1. A cushion mat for integration into an automotive seat, comprising:
    a. a set of metal wire springs;
    b. plastic connectors, connecting the wire springs with each other to form a basic structure of the cushion mat; and
    c. at least one pressure sensor directly connected to one of the plastic connectors configured to provide a seat occupation signal; wherein
    d. the at least one pressure sensor is a membrane switch that turns on when a load applied to the membrane switch exceeds a predetermined value; and wherein
    e. the membrane switch is directly fixed to the plastic connector in the B-plan of the seat between the cushion mat and a foam cushion.

2. The cushion mat according claim 1, wherein the at least one membrane switch is connected to the plastic connector by thermal deformation of parts of the plastic connector.

3. The cushion mat according claim 1, wherein the at least one membrane switch is connected to the plastic connector by over-molding of the plastic connector over a part of the membrane switch.

4. The cushion mat according claim 1, wherein the at least one membrane switch is mechanically connected, glued and/or welded to the plastic connector.

5. The cushion mat according to claim 1, wherein at least one of the plastic connectors comprises an assembly area for the at least one membrane switch.

6. The cushion mat according to claim 5, wherein the assembly area comprises plastic pins that cooperate with corresponding holes of the membrane switch and wherein the pins are thermally deformed to fix the membrane switch at the plastic connector.

7. The cushion mat according to claim 5, wherein the assembly area is arranged at an area of highest load of the cushion mat or at an area of lowest load of the cushion mat.

8. The cushion mat according to claim 7, wherein the membrane switch switches when a load of ≥16 kg is applied to a final seat.

9. The cushion mat according to claim 1, wherein the membrane switch is electrically connected to flexible film wires.

10. The cushion mat according claim 9, wherein at least one of the flexible film wires has an S-shape.

11. The cushion mat according to claim 9, wherein at least one of the flexible film wires has a portion which is formed V-shaped.

12. The cushion mat according to claim 1, wherein the metal wire springs comprise attachment means for the assembly of the cushion mat into a seat frame of an automotive seat, and wherein the attachment means are plastic over-molded metal wire hooks.

13. A method for the production of cushion mats for integration into an automotive seat, comprising the following steps:
   a. injection molding of plastic material around a set of metal wire springs to form a cushion mat with plastic connectors, the plastic connectors having at least one assembly area for a membrane switch;
   b. arranging at least one membrane switch at the assembly area of the plastic connector in the B-plane of the seat between the cushion mat and a foam cushion; and
   c. connecting the membrane switch at the assembly area.

14. The method according claim 13, wherein the step of connecting the membrane switch at the assembly area further comprises the step of thermally deforming a part of the assembly area to fix the pressure sensor.

\* \* \* \* \*